United States Patent [19]
Litz et al.

[11] 3,916,229
[45] Oct. 28, 1975

[54] INDUCTION MOTOR FOR SUPERCONDUCTING SYNCHRONOUS/ASYNCHRONOUS MOTOR

[75] Inventors: Donald C. Litz, Murrysville; Henry E. Haller, III, Pittsburgh, both of Pa.

[73] Assignee: The United States of America as represented by the Secretary of the Navy, Washington, D.C.

[22] Filed: Jan. 3, 1975

[21] Appl. No.: 538,631

[52] U.S. Cl. .............................. 310/52; 310/183
[51] Int. Cl.² ........................................ H02K 9/00
[58] Field of Search ........ 310/10, 40, 52, 182, 183, 310/211, 261, 216–218

[56] References Cited
UNITED STATES PATENTS

| | | | |
|---|---|---|---|
| 3,242,418 | 3/1966 | Mela et al. | 310/52 X |
| 3,513,342 | 5/1970 | Sabev | 310/211 |
| 3,517,231 | 6/1970 | Massar | 310/52 |
| 3,521,091 | 7/1970 | Halas | 310/52 X |
| 3,657,580 | 4/1972 | Doyle | 310/52 |
| 3,679,920 | 7/1972 | MacNab et al. | 310/10 |
| 3,764,835 | 10/1973 | Luck et al. | 310/52 |

*Primary Examiner*—Donovan F. Duggan
*Attorney, Agent, or Firm*—R. S. Sciascia; P. Schneider; W. T. Ellis

[57] ABSTRACT

An induction motor structure for use on the outside of a superconducting rotor comprising a cylindrical shell of solid and laminated, magnetic iron with squirrel cage windings embedded in the outer circumference of said shell. The sections of the shell between the superconducting windings of the rotor are solid magnetic iron. The sections of the shell over the superconducting windings are made of laminations of magnetic iron. These laminations are parallel to the axis of the machine and are divided in halves with the laminations in each half oriented in diagonal opposition so that the intersection of the laminations forms a V. This structure presents a relatively high reluctance to leakage flux from the superconducting windings in the synchronous operating mode, while presenting a low reluctance path to the stator flux during asynchronous operation.

3 Claims, 1 Drawing Figure

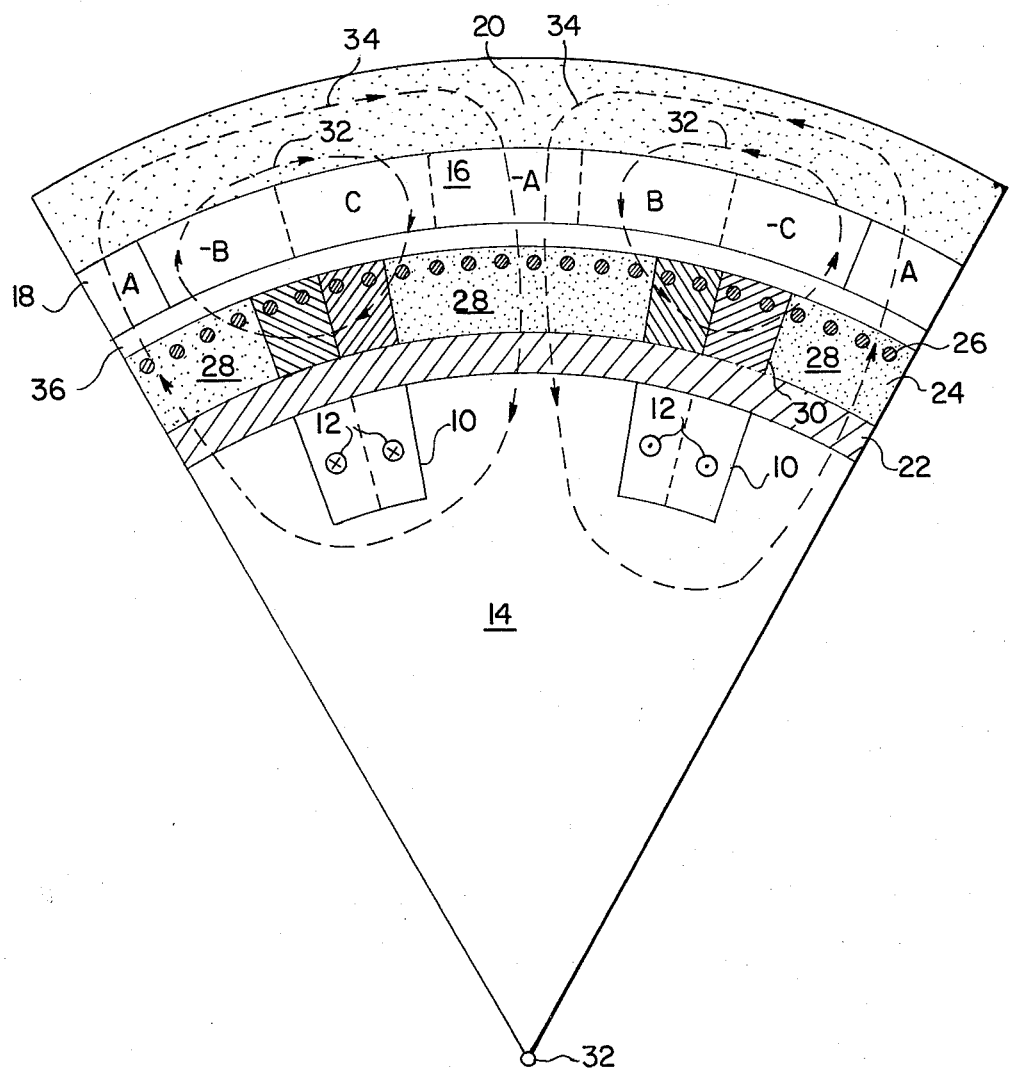

INDUCTION MOTOR FOR SUPERCONDUCTING SYNCHRONOUS/ASYNCHRONOUS MOTOR

BACKGROUND OF THE INVENTION

1. Field of Invention

The present invention relates generally to synchronous superconducting motors and in particular to rotor-pole structure for synchronous superconducting motors.

2. Description of the Prior Art

A synchronous motor which is required to start and reverse under load must do so asynchronously. This asynchronous operation subjects the motor rotor windings to a time-varying, magnetic flux of considerable amplitude.

While in conventional motors the phenomenon described has presented design problems which have been adequately resolved, the use of a superconducting field winding presents an added problem since practical superconducting materials exhibit an undesirably high power loss when subjected to timevarying magnetic flux. This loss is known in the art as "A.C. Loss" and is similar to hystersis loss in the magnetization of iron.

Therefore, a superconducting synchronous motor must have an induction motor structure on the outside part of the rotor (typically a squirrel-cage winding). This structure, if of conventional design, presents a low reluctance leakage path for flux during synchronous operation. This leakage results in a significant decrease in power rating for synchronous operation.

SUMMARY OF THE INVENTION

Briefly, the superconducting rotor of the present invention comprises a superconducting field-winding means with a magnetic-pole-structure means surrounding it. This pole-structure means contains an induction motor structure embedded in its outer circumference. Above each superconducting winding of said superconducting field-winding means, the pole structure means is made of laminations of magnetic material. These laminations run parallel to the axis of the rotor and are oriented so that a series of lamination air gaps is presented to the flux flow during synchronous operation while, during asynchronous operation, the lamination ends are presented to the flux flow. Thus these laminations provide a relatively high reluctance during synchronous operation to any flux leaking through the induction motor structure back to the superconducting windings while, during asynchronous operation, they provide a low reluctance path for the flux flowing around the induction motor windings.

OBJECTS OF THE INVENTION

An object of the present invention is to provide a superconducting rotor which carries the A.C. flux of an induction motor operation without having an appreciable effect on the synchronous mode of operation.

A further object of the present invention is to increase the performance rating of a synchronous, superconducting motor with an induction motor structure on its rotor.

A still further object is to reduce the leakage flux through the outer, induction-motor structure during the synchronous operation of a superconducting motor while providing a low reluctance path around the induction-motor windings during asynchronous operation.

Other objects, advantages, and novel features of the present invention will become apparent from the following detailed description of the invention when considered in conjunction with the accompanying drawings.

BRIEF DESCRIPTION OF THE DRAWING

The single FIGURE shows an axial, quarter, cross-sectional view of an embodiment of the rotor structure of the present invention.

DETAILED DESCRIPTION OF THE INVENTION

Referring now to the drawing, the superconducting windings for the basic snychronous operation of the motor are designated as the blocks 10. The center conductor representations 12 illustrate the direction of current for one winding configuration. The blocks 10, of course, contain many thousands of winding wires 12. The inner rotor structure 14 may contain magnetic material to improve the flux permeability during synchronous operation.

A typical superconducting winding only exhibits its superconducting properties (zero resistance) at 4.2° Kelvin. Thus a thermal insulation layer 22 must encase the inner superconducting structure to prevent heat from the outer, ambient temperature structures from entering. Generally a Dewar structure is used to effect a thermal insulation. A typical Dewar configuration would comprise two, stainless steel, cylindrical shells with a ⅛ inch vacuum between them.

An induction motor structure 24 encloses the insulation structure 22. This induction motor structure 24 comprises a cylindrical shell of magnetic material with an induction winding 26 embedded in the outer circumference of the cylindrical shell. The induction winding in the figure is a squirrel-cage induction winding comprising a series of metallic bars (typically copper) embedded in the cylindrical shell and shorted at the ends. However, the invention is not restricted to this type of induction, motor structure. For instance, a wound-type winding with slip rings and external resistors is another induction winding that could be used.

The novelty of this rotor configuration resides in the construction of the cylindrical, induction-motor shell. The section 28 of the cylindrical shell which lies between the superconducting windings 10, is of solid magnetic material. The section 30 which lies radially over the superconducting windings 10 is made of laminations of magnetic material. These laminations 30 are parallel to the axis 30 (into the paper) of the rotor and are divided into sections with at least two of the sections forming opposing diagonals such that, if they are extended to intersect, the laminations form a V at the intersection pointing down toward the superconducting winding 10.

In the FIGURE the lamination structure 30 is divided into halves, with the laminations in each half oriented in opposing diagonals, such that the intersection of the laminations forms a V pointing at the superconducting windings 10. This is the simplest and most easily manufactured configuration.

The stator 16 comprises a three-phase armature winding 18 with an iron backing 20. The armature winding may take any of the well-known configurations such as the air gap winding, or the conventional tooth-and-slot configuration.

The asynchronous operation of the machine will be discussed first since the motor, when under load, must start and reverse asynchronously. The stator windings 18 are supplied with balanced, three-phase voltages. Each of the three voltage phases is supplied to a different winding 18 in the well-known fashion so that a rotating, magnetic-flux field is set up. The dashed line 32 represents the flux path for this asynchronous operation. From the drawing it can be seen that this flux path 32 links the rotor induction windings 26. The change in the flux linkages 32 due to the rotation of this stator flux field induces voltages in the induction windings 26. Electrical currents flow in the windings 26 in accordance with these induced voltages. These winding currents interact with the rotating, stator flux to produce a magnetomotive force on the induction windings 26 in the direction of rotation of the stator flux.

When driving a load, the rotor approaches synchronous speed due to the magnetomotive force produced by the current-flux interaction. The rotor operating speed is less than the synchronous speed by an amount (the slip speed) sufficient to develope a torque equal and opposite to that of the load. When the induction winding has brought the rotor sufficiently close to synchronous speed, a D.C. current is driven through the superconducting windings 10. Due to the zero resistance of the superconducting windings 10, a high D.C. current density is obtained. This high current density forces the stator flux 32 to form the flux path 34 linking the superconducting windings 10. The magnetic flux field generated by this high-density, D.C. current in the windings 10 tries to line up with the rotating, magnetic flux field of the stator windings 18. This flux field interaction forces the rotor to pull into synchronism with the stator flux.

The power out of the machine during synchronous operation is proportional to the mutual inductance around both the superconducting windings 10 and the stator windings 18. Thus it is clearly desirable to maximize the flux linkages surrounding these two windings. But the flux field naturally takes the path of highest magnetic permeability. The magnetic-material shell 24 which is required for the induction-motor windings 26 presents such a path of high permeability. Thus clearly there is a strong tendency for the flux field developed by the D.C. current in the superconducting windings 10 to leak through the magnetic shell 24 and back around the windings 10 rather then to jump the low-permeability air gap 36 and link the stator windings 18 as shown by the flux path 34. This leakage substantially degrades the power performance of the synchronous mode of motor operation.

The lamination structure 30 of the present invention solves this leakage problem by presenting a relatively high reluctance path to flux trying to leak through the magnetic shell 24 during synchronous operation. This high reluctance path occurs because the flux from the superconducting windings 10 must approach the laminations 30 at an angle to the lamination planes. Thus the series of "air gaps" between the laminations must be crossed in order to leak through the shell 24.

During asynchronous operation, the flux from the stator windings 18 approaches approximately in the plane of the laminations 30. Thus the flux field from the stator can travel along the laminations planes (the V formed by the lamination in the FIGURE) without ever crossing a lamination air gap (Dashed-line, flux path 32). This low reluctance path along the lamination planes of the lamination section 30 permits the linking of the induction motor windings 26 by the stator flux with ease.

Thus, in summary, in order to effect a low-reluctance path during asynchronous operation while effecting a high reluctance path during synchronous operation, these laminations must be set so that the superconducting, rotor flux of synchronous operation approaches the lamination at an angle to the lamination planes while the stator flux approaches the laminations head-on to the lamination planes. Clearly, a large number of lamination configurations would be suitable to effect this result. For example, the laminations could be formed by layers of semi-circles, or by layers wherein the ends are formed by opposing diagonal planes which connect indirectly by way of a flat piece of lamination or by any other suitable lamination connection. Each lamination must be continuous though, in order to provide a complete path through the lamination section 30.

The opposing, diagonal, plane laminations shown in the FIGURE are the simplest case of the above design requirements. The laminations are divided in halves and directly connected to form a V. This is clearly the most easily manufactured of the configurations.

Because the dewar structure 22, which is nonmagnetic, lies between the induction motor structure 24 and 26 and the inner rotor structure, this inner rotor structure 14 has very little effect on the asynchronous operation of the motor. Thus, this inner motor structure 14 may contain magnetic material to improve the flux permeability during synchronous operation. This magnetic material addition has only a slight effect on the asynchronous flux and allows a reduction in the number of superconducting windings required to drive the motor in its synchronous mode.

The magnetic material most commonly used in the outer magnetic shell 24 and the inner rotor structure 14 is magnetic iron. The lamination section 30 may also be made of magnetic iron. Iron is chosen because of its high physical strength in addition to its good magnetic-permeability characteristic.

It should be noted that the configuration of the stator and of the superconducting portion of the rotor shown in the FIGURE is for purposes of illustration only. There are a variety of options in the design of a superconducting synchronous motor which, when combined with this induction motor structure, can be used in the design of a superconducting, synchronous/asynchronous motor.

Obviously, many modifications and variations of the present invention are possible in light of the above teachings. It is therefore to be understood that, within the scope of the appended claims, the invention may be practiced otherwise than as specifically described.

What is claimed is:

1. A rotor for a superconducting synchronous motor with an outer induction-motor structure comprising:
   superconducting field-winding means;
   magnetic-material shell means made of solid and laminated magnetic material surrounding said superconducting field winding means;
   induction-motor means located in the outer periphery of said magnetic shell means for asynchronous operation;

said magnetic-material laminations running parallel to the axis of said superconducting field-winding means and radially above each superconducting winding of said superconducting field-winding means, said laminations being oriented so that a series of the lamination air gaps is presented to the flux flow during synchronous operation to provide a relatively high reluctance to any flux leakage through said induction-motor means while, during asynchronous operation, the lamination ends are presented to the flux flow so that a low reluctance path for the stator flux is provided around said induction motor means.

2. A rotor as defined in claim 1 wherein said laminations located radially above each superconducting winding are divided and oriented into at least two opposing diagonals so that the intersections of the divided laminations present a closed, essentially convex surface to said superconducting windings.

3. A rotor as defined in claim 1 wherein said laminations located radially above each superconducting winding are divided in halves, with the laminations in each half oriented in diagonal opposition so that the intersection of the laminations forms a V with its intersection pointing at said superconducting winding.

* * * * *